Figure 1:
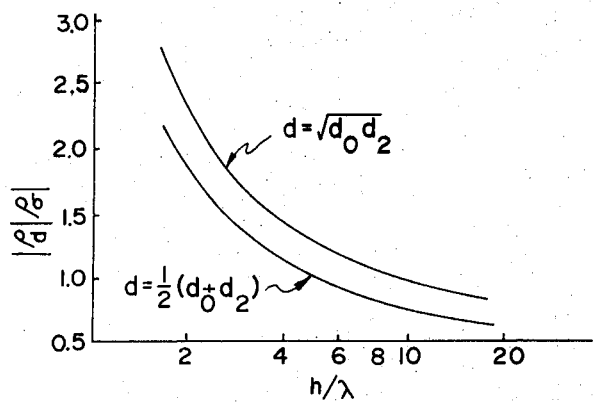

United States Patent

Torre et al.

[11] 3,827,035
[45] July 30, 1974

[54] MAGNETIC DOMAIN PROPAGATION PLATE WITH MINIMIZED TEMPERATURE SENSITIVITY

[75] Inventors: Edward Della Torre, Toronto, Ontario; Magid Dimyan, Hamilton, Ontario, Canada

[73] Assignee: Canadian Patents and Development Limited, Ontario, Canada

[22] Filed: Oct. 26, 1972

[21] Appl. No.: 300,885

[52] U.S. Cl. ............... 340/174 TF, 340/174 SC
[51] Int. Cl. ........................................... G11c 11/14
[58] Field of Search .............. 340/174 SC, 174 TF

[56] References Cited
UNITED STATES PATENTS
3,508,221   4/1970   Thiele ........................ 340/174 TF OTHER PUBLICATIONS
IBM Tech Disc. Bulletin, "Thermal Manipulation of Bubble Domains" by Gambino et al. Vol. 13, No. 7, 12/70, pp. 1788–1790.
IEEE Transactions on Magnetics, "Temperature Dependence of Rare-Earth Orthoferrite Properties Relevant to Propagating Domain Device Applications" by Rossol; Vol. 5, No. 3, 9/69; pp. 562–565.

Primary Examiner—Stanley M. Urynowicz, Jr.
Attorney, Agent, or Firm—J. R. Hughes

[57] ABSTRACT

A magnetic domain propagation plate having a preferred direction of magnetization normal to the plate and being made of a material and having a plate thickness such that the diameter of bubbles formed in the plate have a minimum sensitivity to temperature variations, these parameters being determined by minimizing the quality $\rho_d$:

$$\rho_d = \frac{\left(F + \frac{\lambda}{h}\right) M_s - \frac{\lambda}{h}\rho_\sigma}{S_o + \frac{\lambda}{h}}$$

where
$\rho_d = (1/d)\, dd/dT$
$d$ = bubble diameter
$T$ = temperature
$F$ = magnetostatic force function
$\lambda$ = material length
$h$ = plate thickness
$S_o$ = radial stability function
$\rho_\sigma = 1/\sigma\ (d\sigma/dT)\ \sigma M_s = 1/M_s\ (dM_s/dT)$
$\sigma$ = wall energy density per unit area, and
$M_s$ = saturation magnetization.

2 Claims, 3 Drawing Figures

MAGNETIC DOMAIN PROPAGATION PLATE WITH MINIMIZED TEMPERATURE SENSITIVITY

This invention relates to magnetic domain propagation plates and more particularly to a method of forming magnetic domain or bubble devices having a fixed bubble diameter insensitive to temperature variations.

In a practical bubble device it is desirable to keep the bubble size independent of temperature in order to keep optimum coupling with drive or propagation circuits.

The temperature sensitivities of bubble diameter in two different types of uniaxial magnetic materials have been derived in terms of the material parameters. See paper entitled "Temperature Sensitivity of Bubble Domains" by M. Y. Dimyan and E. Della Torre in Journal of Applied Physics, Vol. 43, page 1285 (1972).

The temperature coefficient of bubble diameter ($\rho_d$), that is the fractional change in bubble diameter for a one degree change in temperature, is defined by $$\rho_d = (1/d)\, dd/dT \qquad (1)$$

where $d$ is the bubble diameter and T is the temperature. Similarly, the temperature coefficients of wall energy ($\sigma$) and the magnetization ($M_s$) are given by:

$$\rho_\sigma = (1/\sigma)\, d\sigma/dT \qquad (2)$$

and $$\rho_{M_s} = (1/M_s)\, dM_s/dT \qquad (3)$$

The equilibrium equation for bubble diameter is given by:

$$\lambda/h + (d/h)(H/4\pi M_s) - F(d/h) = 0 \qquad (4)$$

where $\lambda$ is the material length defined by $$\lambda = \sigma/4\pi M_s^2 \qquad (5)$$

$h$ is the thickness of the crystal, H is the applied bias field, and $F(d/h)$ is the magnetostatic force function.

Differentiating (4) with respect to temperature under the condition that $h$ and H do not change with temperature yields:

$$1/h(d\lambda/dT) - (d/h)H/4\pi M_s^2(dM_s/dT) + (H/4\pi M_s)1/h(dd/dT) - (dF/dd)dd/dT = 0 \qquad (6)$$

From (5)

$$d\lambda/dT = 1/4\pi M_s^2(d\sigma/dT) - (2\sigma/4\pi M_s^3)dM_s/dT \qquad (7)$$

or from (2), (3) and (5)

$$d\lambda/dT = \lambda(\rho_\sigma - 2\rho_{M_s}) \qquad (8)$$

Now (6) becomes $$\lambda/h(\rho_\sigma - 2\rho_{M_s}) - (d/h)(H/4\pi M_s)\rho_{M_s} + (d/h)([H/4\pi M_s] - F)\rho_d = 0 \qquad (9)$$

where $$\dot{F} = dF(d/h)/d(d/h) \qquad (10)$$

Eliminating $H/4\pi M_s$ by use of (4) yields $$(\lambda/h)\rho_\sigma - (F + [\lambda/h])\rho_{M_s} + (F - [\lambda/h] - [d/h]\dot{F})\rho_d = 0$$

But the radial stability function $S_o$ is defined by $$S_o(d/h) = F(d/h) - 2(\lambda/h) - (d/h)\dot{F} \qquad (11)$$

Therefore $$\rho_d = \frac{\left(F + \dfrac{\lambda}{h}\right)\rho_{M_s} - \dfrac{\lambda}{h}\rho_\sigma}{S_o\left(\dfrac{d}{h}\right) + \dfrac{\lambda}{h}} \qquad (12)$$

It is the object of the present invention to provide a method of selecting and forming magnetic domain propagation plates having thickness such that the temperature coefficient of bubble diameter is zero or a minimum for bubbles formed in the plate for known operating conditions.

Figure 2:
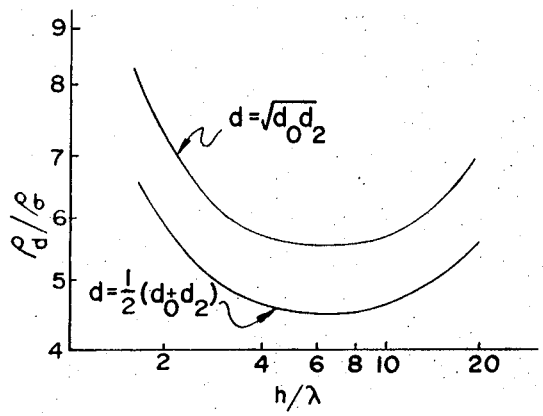
Figure 3:
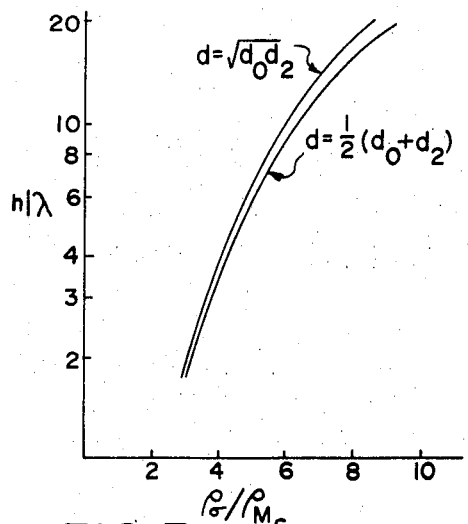

In drawings which illustrate curves on which selection of plate thickness may be based:

FIG. 1 is a plot of the ratio of the fractional changes in wall energy density and magnetization for zero temperature sensitivity as a function of plate thickness for two bias conditions, FIG. 2 is a plot of $\rho_d/\rho_{M_s}$ as a function of thickness for the same two bias conditions, and FIG. 3 is a plot of optimum thickness normalized to the material length as a function of $\rho_\sigma/\rho_{M_s}$ for two bias conditions $d = (d_o d_2)^{1/2}$ and $d = \frac{1}{2}(d_o + d_2)$ where $d_o$ is the bubble collapse diameter and $d_2$ the run-out diameter.

The following three cases will be considered:

I. $\rho_\sigma = 0$, II. $\rho_{M_s} = 0$ and III. $\rho_{M_s} \neq 0, \rho_\sigma \neq 0$ but $\rho_\sigma > 2\rho_{M_s}$. Case 1: This applies to materials such as mixed rare earth orthoferrites operating near the spin reorientation temperature. Then $$\rho_d = \frac{\dfrac{\lambda}{h}}{S_o\left(\dfrac{d}{h}\right) + \dfrac{\lambda}{h}} \rho_\sigma. \qquad (13)$$

A plot of $|\rho_d/\rho_\sigma|$ as a function of the thickness for this case is shown in FIG. 1 for two bias conditions, $d = (d_1 d_2)^{1/2}$ and $d = \frac{1}{2}(d_o + d_2)$, where $d_o$ is the bubble collapse diameter (smallest bubble diameter that can be maintained) and $d_2$ the run-out diameter (diameter at which the bubble runs out into a strip). It is seen that for this material the plate should be as thick as possible subject to other constraints. Case II; This applies to some garnets at temperature near the compensation temperature. Then $$\rho_d = \frac{\left(F + \dfrac{\lambda}{h}\right)}{S_o + \dfrac{\lambda}{h}} \rho_{M_s} \qquad (14)$$

A plot of $\rho_d/\rho_{M_s}$ as a function of thickness for this case is shown in FIG. 2 for the same two bias conditions. For these materials the thickness should be between $4\lambda$ and $10\lambda$. Case III: If neither $\rho_{M_s}$ nor $\rho_\sigma$ is negligible then under certain conditions it is possible to make $\rho_d = 0$ which is the optimum condition. From (12) it is seen that $\rho_d$ will be zero if $$\rho_\sigma/\rho_{M_s} = [F + (\lambda/h)]/(\lambda/h) = 1 + (hF/\lambda) \qquad (15)$$

Applying (4) this may be rewritten $$\rho_\sigma/\rho_{M_S} = 2 + (d/\lambda)H/4\pi M_s \quad (16)$$

Since the second term is positive, the condition for $\rho_d = 0$ can only be satisfied if $$\rho_\sigma/\rho_{M_S}0 > 2 \quad (17)$$

FIG. 3 is a plot of optimum thickness normalized to the material length as a function of $\rho_\sigma/\rho_{M_S}$ for the two bias conditions $d = (d_o d_2)^{1/2}$ and $d = \frac{1}{2}(d_o + d_2)$ where $d_o$ and $d_2$ have been defined above. This curve may be used to select the appropriate uniaxial material which will give zero temperature sensitivity of bubble diameter in a bubble device if the operating conditions are known. Equations (15) and (16) provide means of determining the plate thickness required to give minimum temperature sensitivity of bubbles provided operating conditions are known and can be specified.

What is claimed is:

1. A magnetic domain propagation plate having preferred direction of magnetization normal to the plate and being made of mixed rare earth orthoferrite material and having a plate thickness such that the diameter of bubbles formed in the plate have a minimum sensitivity to temperature variations, said thickness being determined by minimizing the quantity $\rho_d = 1/d(dd/dT)$:

$$\rho_d = \frac{\left(F + \frac{\lambda}{h}\right) M_s - \frac{\lambda}{h}\rho_\sigma}{S_o + \frac{\lambda}{h}}$$

where
F is the magnetostatic force function
$\lambda$ is the material characteristic length
$h$ is the plate thickness
$S_o$ is the radial stability function
$\rho_\sigma = (1/\sigma)d\sigma/dT = 0$ (for rare earth orthoferrite)
$\rho_{M_S} = 1/M_s(dM_s/dT)$
$\sigma$ is the wall energy density per unit area
$M_s$ is the saturation magnetization, and
T is the temperature.

2. A magnetic domain propagation plate having preferred direction of magnetization normal to the plate and being made of garnet material and having a plate thickness such that the diameter of bubbles formed in the plate have a minimum sensitivity to temperature variations, said thickness being determined by minimizing the quantity $\rho_d = 1/d(dd/dT)$:

$$\rho_d = \frac{\left(F + \frac{\lambda}{h}\right)_{M_s} - \frac{\lambda}{h}\rho_\sigma}{S_o + \frac{\lambda}{h}}$$

where
F is the magnetostatic force function
$\lambda$ is the material characteristic length
$h$ is the plate thickness
$S_o$ is the radial stability function
$\rho_\sigma = (1/\sigma)d\sigma/dT$
$\rho_{M_S} = (1/M_s)dM_s/dT = 0$ (for garnet materials)
$\sigma$ is the wall energy density per unit area
$M_s$ is the saturation magnetization, and
T is the temperature.

* * * * *